(12) United States Patent
Choi

(10) Patent No.: US 8,310,803 B2
(45) Date of Patent: Nov. 13, 2012

(54) DEVICE FOR SAVING ELECTRICAL POWER

(76) Inventor: Sung Gwun Choi, Seoul (KR)

( * ) Notice: Subject to any disclaimer, the term of this patent is extended or adjusted under 35 U.S.C. 154(b) by 416 days.

(21) Appl. No.: 12/596,666

(22) PCT Filed: Apr. 24, 2008

(86) PCT No.: PCT/KR2008/002328
§ 371 (c)(1),
(2), (4) Date: Oct. 19, 2009

(87) PCT Pub. No.: WO2008/133438
PCT Pub. Date: Nov. 6, 2008

(65) Prior Publication Data
US 2010/0134949 A1    Jun. 3, 2010

(30) Foreign Application Priority Data

Apr. 25, 2007   (KR) .................. 10-2007-0040356
Mar. 7, 2008    (KR) .................. 10-2008-0021719

(51) Int. Cl.
*H01G 4/00*   (2006.01)
*H01G 4/30*   (2006.01)
(52) U.S. Cl. .................. 361/301.2; 361/301.4
(58) Field of Classification Search .................. 361/305, 361/301.2, 301.4
See application file for complete search history.

(56) References Cited

U.S. PATENT DOCUMENTS

| | | | | |
|---|---|---|---|---|
| 4,496,475 A | * | 1/1985 | Abrams | 252/514 |
| 5,978,994 A | * | 11/1999 | Anderson | 8/158 |
| 2005/0052824 A1 | * | 3/2005 | Jyoya et al. | 361/321.5 |
| 2007/0098814 A1 | * | 5/2007 | Xu et al. | 424/617 |

FOREIGN PATENT DOCUMENTS

| | | | |
|---|---|---|---|
| JP | 2000-182567 | | 6/2000 |
| JP | 2003217645 A | * | 7/2003 |
| KR | 20-0307029 | | 3/2003 |
| KR | 2004-0028811 | | 4/2004 |
| KR | 10-0638051 | | 10/2006 |
| KR | 2008026823 A | * | 3/2008 |

OTHER PUBLICATIONS

International Preliminary Report on Patentability of PCT/KR2008/002328 dated Sep. 2, 2009.
Choi, Sung-Kwun et al., The Pyroelectric Function of Tourmaline Powders in an Electric Power Saving System.

* cited by examiner

*Primary Examiner* — David M Sinclair
(74) *Attorney, Agent, or Firm* — Christopher Paul Mitchell

(57) ABSTRACT

A device for saving electric power of the present invention comprises a case body; a tourmaline intermediate layer accommodated in the case body, which is a mixture layer of tourmaline power, permanent magnet power and moisture (H2O); ionization plates respectively positioned on upper and lower surfaces of the tourmaline intermediate layer interposed therebetween in the case body; and a conductive plate embedded in the tourmaline intermediate layer.

7 Claims, 5 Drawing Sheets

[Fig. 1]
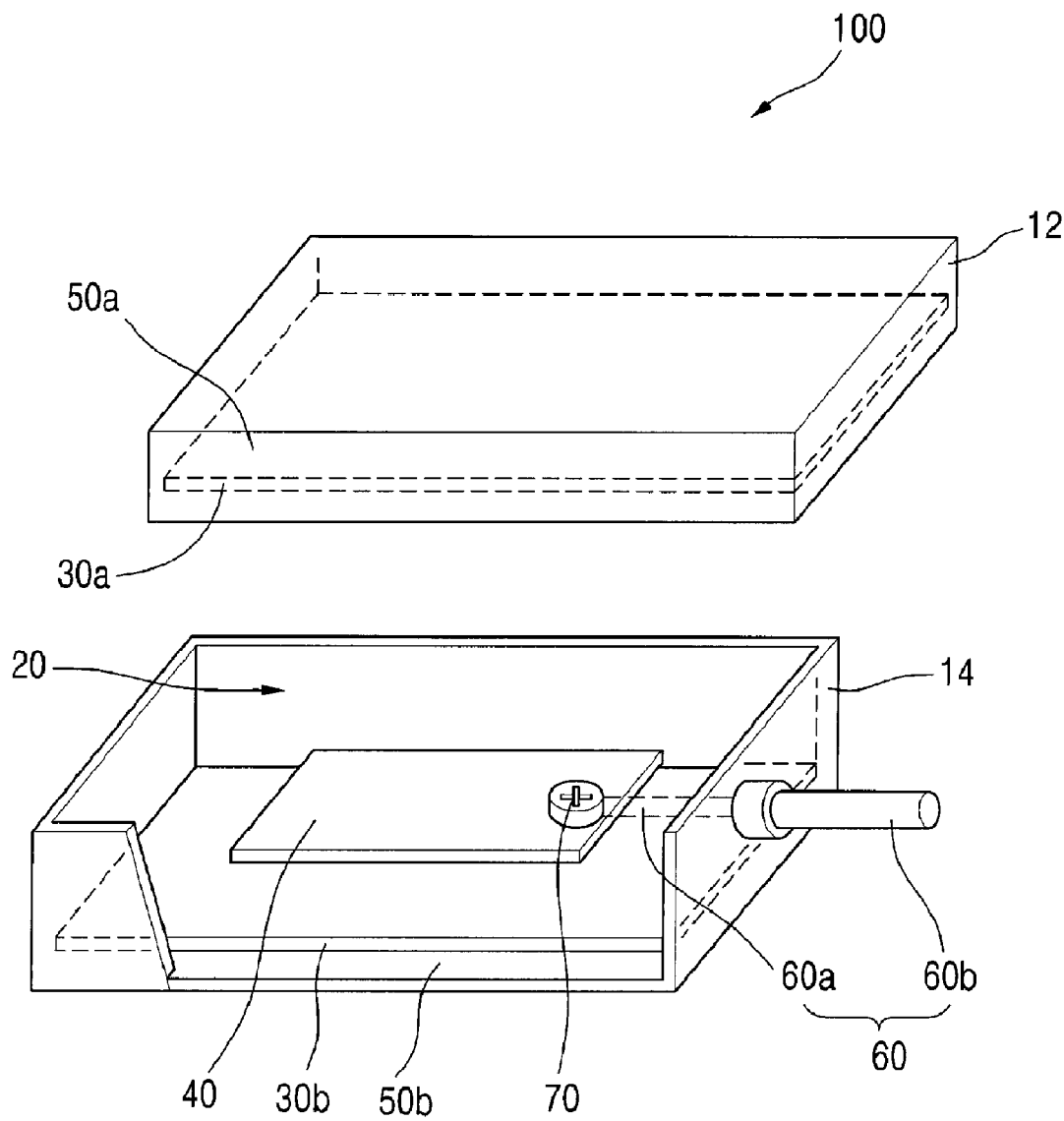

[Fig. 2]
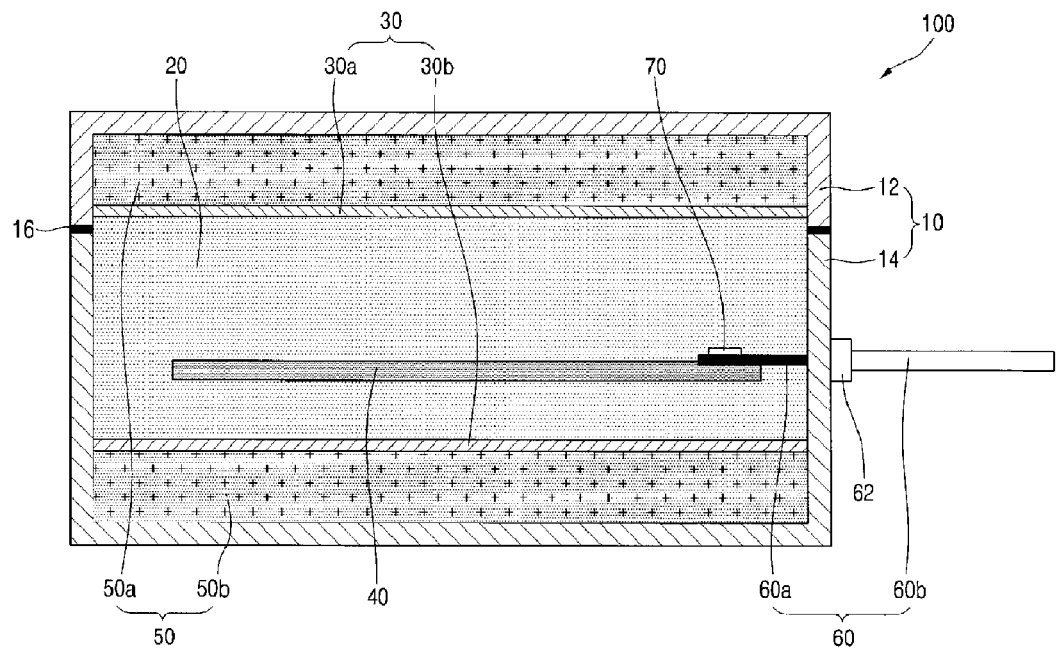
[Fig. 3]
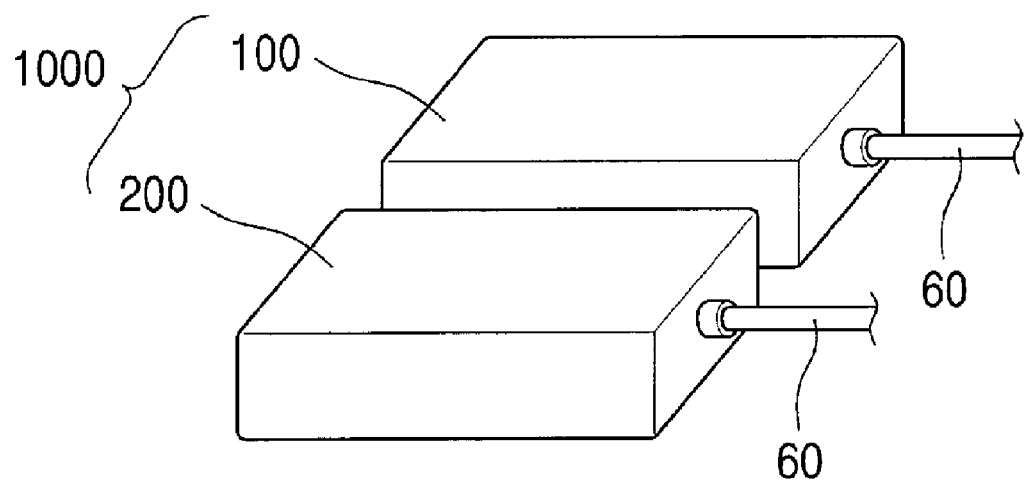

[Fig. 4]
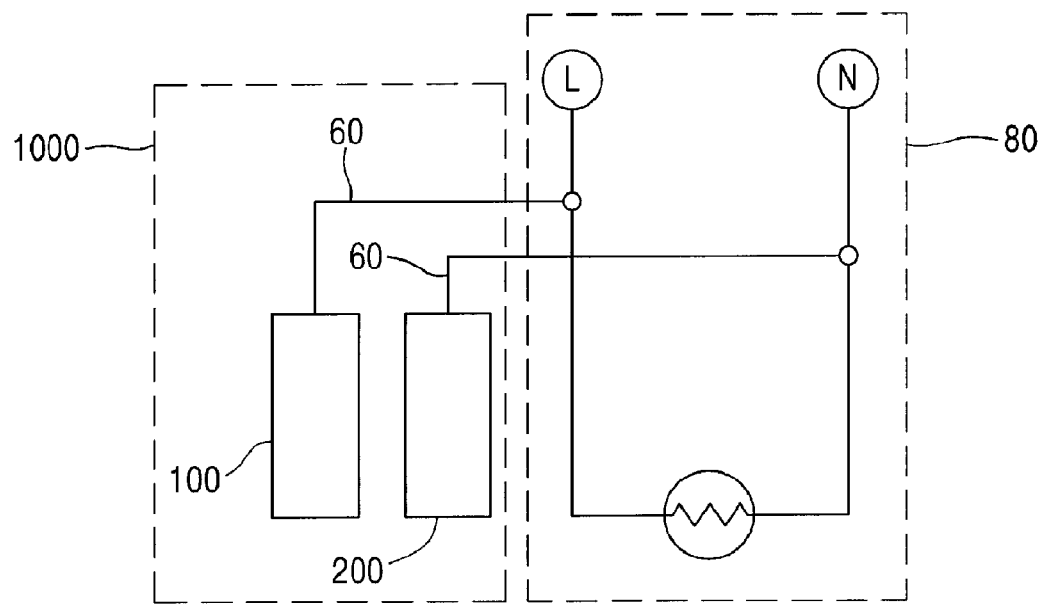
[Fig. 5]
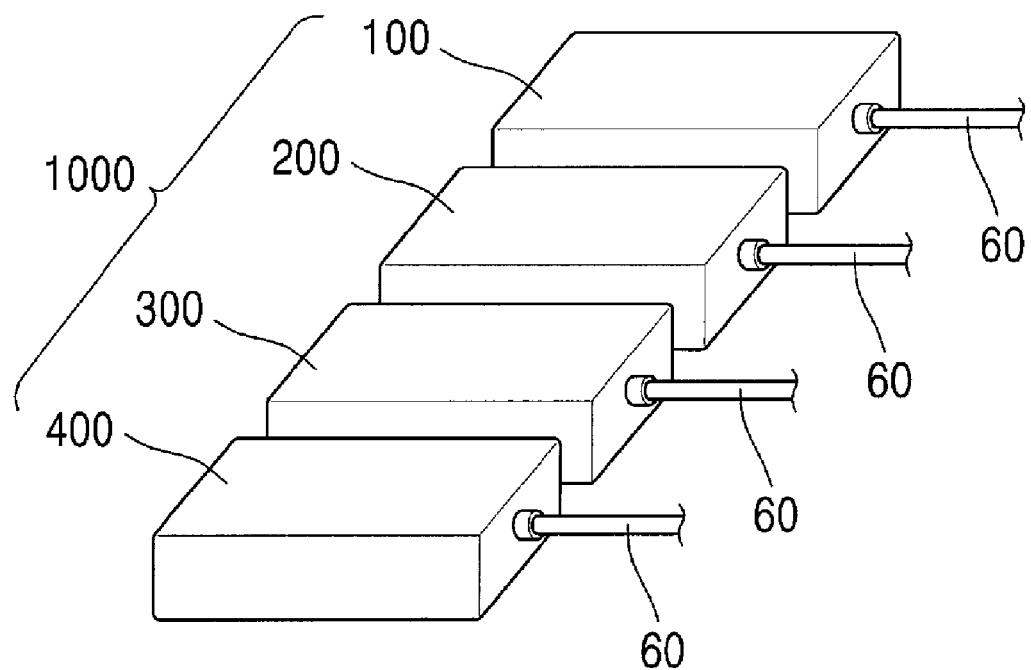

[Fig. 6]
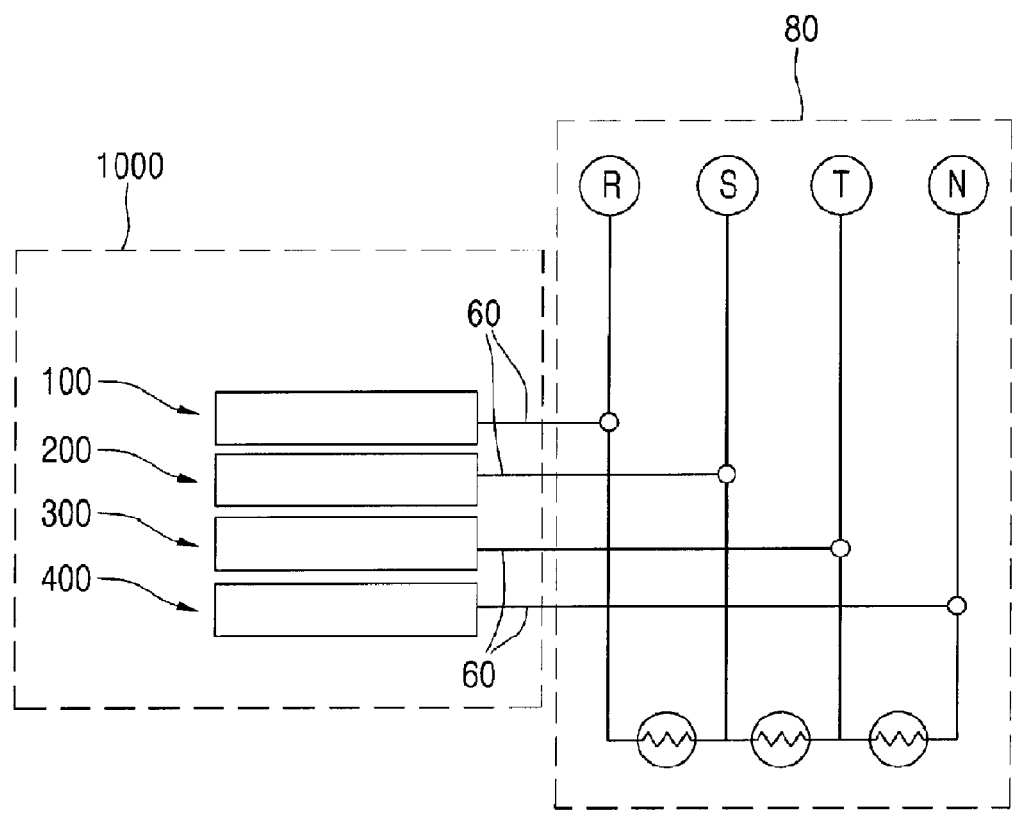

[Fig. 7]
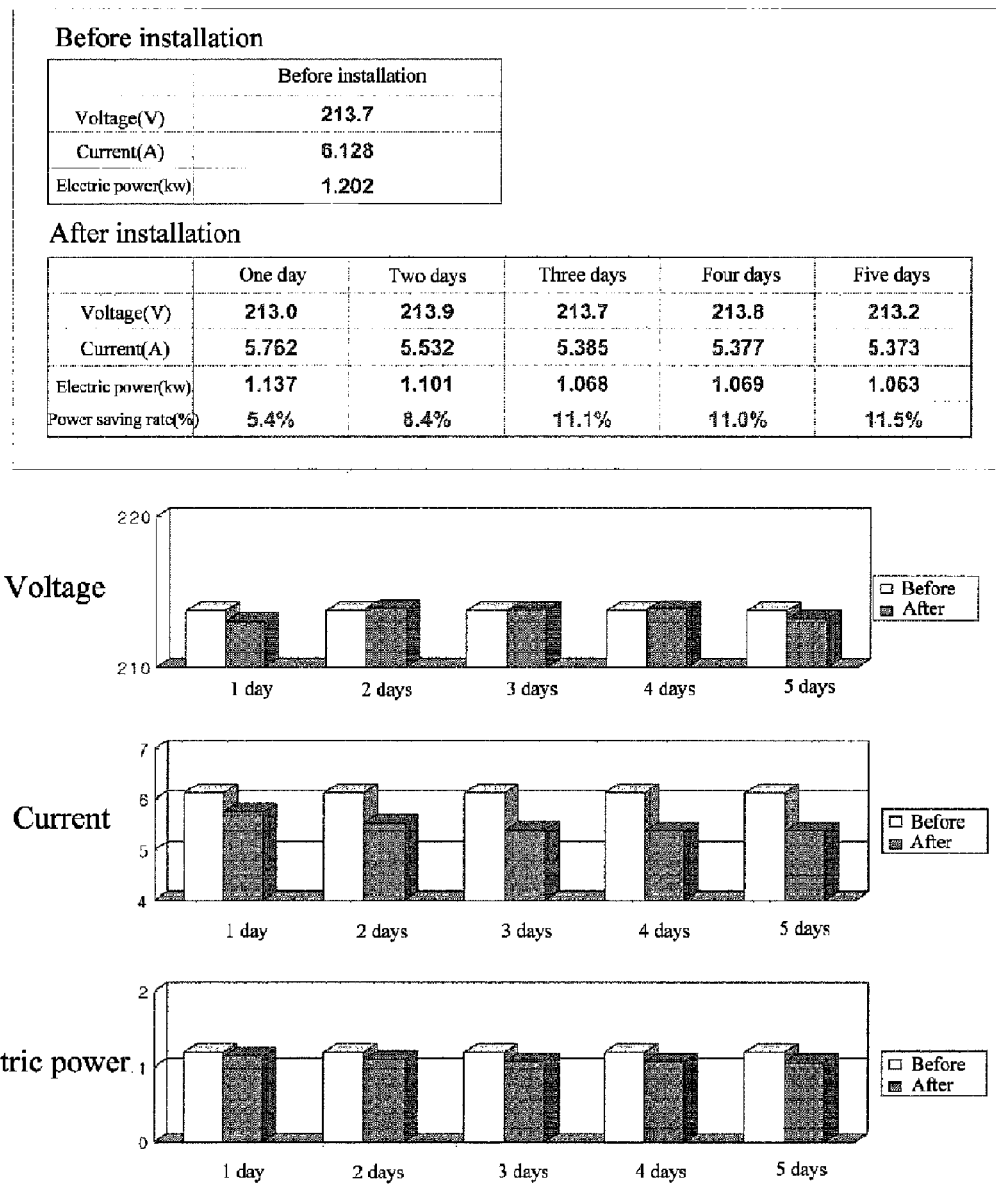

DEVICE FOR SAVING ELECTRICAL POWER

RELATED APPLICATIONS

This application is a 371 application of International Application No. PCT/KR2008/002328, filed Apr. 24, 2008, which in turn claims priority from Korean Patent Application Nos. 10-2007-0040356, filed Apr. 25, 2007, and 10-2008-0021719, filed Mar. 7, 2008, all of which are incorporated herein by reference.

TECHNICAL FIELD

The present invention relates to a device for saving electric power through current improvement, and more particularly, to a device for saving electric power by improving the movement and flow of electrons using a mixture of a tourmaline mineral having a permanent electric property and a permanent magnet powder having a permanent magnetic property.

BACKGROUND ART

Recently, studies have been actively conducted to develop alternative energy resources for substituting for coal and oil due to environmental pollution and lack of energy resources. For example, studies have been actively conducted to develop and effectively utilize energy resources using nuclear power, wind power, tidal power, solar power, or the like.

However, thermal energy generated from coal, oil or nuclear power may be directly used, but most of the thermal energy is generally converted into electric energy. In addition, it is impossible to directly utilize energy generated from wind power, solar power or tidal power, and the generated energy should be converted into electric energy through wind power generation, solar power generation or tidal power generation.

Therefore, most energy is converted into electric energy for convenience of human beings. The amount of electric energy used is increased every year, and the supply price of electric energy also tends to be increased due to an increase in price of fossil energy resources. Thus, a variety of efforts have been socially and economically made to save electric energy. Particularly, it is required to develop power saving products, to improve a power transmission process and to develop a device for saving electric power.

Regarding such a device and method for saving electric power, a method for saving electric power using far-infrared has been disclosed in Japanese Laid-open Patent Publication No. Hei 4-261355, in which a ceramic mineral radiating far-infrared is mounted in a shaft portion of a motor to restrain a resistance load caused by the heat generation of the motor from being produced, thereby saving electric power. In addition, a method for saving electric power has been disclosed in Korean Laid-open Patent Publication No. 2002-0028862, in which far-infrared radiated from a far-infrared radiator such as sericite or geumgangyakdol is supplied to an electric line and resonant absorption is maximized, thereby saving electric power.

However, all the conventional methods are methods using far-infrared, in which far-infrared with a certain wavelength band (8 to 11 μm) should be generated. If the amount of the generated far-infrared does not satisfy a predetermined level, there is a problem in that a power saving effect may be lowered. For example, when a mineral such as the aforementioned sericite is powdered and applied to a box with certain dimensions, the amount of the radiated far-infrared is not satisfactory, and the power-saving effect is also not satisfactory.

In connection with the foregoing, a device for saving electric power has been disclosed in Korean Patent No. 10-0419312, in which a ceramic layer, which is made of sericite as a main material to emit rotating electromagnetic waves, is provided on an inner wall of the device for saving electric power, and an inner cover plate for performing resonant absorption by repeatedly absorbing and emitting rotating electromagnetic waves emitted from the ceramic layer is installed in the device for saving electric power. In the patent document, a method is employed, in which rotating electromagnetic waves emitted from the ceramic layer are converted into far-infrared in a free space, and the far-infrared generates resonant absorption (repeating reflection and absorption) between a ceramic layer of a housing inner wall and a ceramic layer of the inner cover plate, thereby increasing the amount of the generated rotating electromagnetic waves (i.e., far-infrared). However, in the method, the amount of the generated far-infrared is not, satisfactory, and the power-saving effect is insignificant. Thus, the method does not have the power-saving effect that can be commercially useful.

Therefore, the conventional device and method for saving electric power using far-infrared have problems to be solved.

Meanwhile, electric power may be defined as the product of voltage, current and power factor. Therefore, if a current value is decreased by improving flow of current, it is possible to save electric power.

The inventor has conceived a new material and device capable of improving flow of current. That is, the inventor has paid attention to the aspect that the movement and flow of electrons can be improved if using a tourmaline mineral having a permanent electric property.

Accordingly, the inventor has conceived a device for saving electric power by improving the movement and flow of electrons using a mixture of a tourmaline mineral having a permanent electric property and a permanent magnet powder having a permanent magnetic property.

DISCLOSURE OF INVENTION

Technical Problem

The present invention is conceived to solve the problems of the aforementioned conventional device for saving electric power using far-infrared. An object of the present invention is to provide a device for saving electric power, which has an excellent power saving effect by improving flow of current.

Specifically, an object of the present invention is to provide a device for saving electric power by improving the movement and flow of electrons using a mixture of a tourmaline mineral having a permanent electric property and a permanent magnet powder having a permanent magnetic property.

Technical Solution

A device for saving electric power of the present invention comprises a case body; a tourmaline intermediate layer accommodated in the case body, which is a mixture layer of tourmaline powder, permanent magnet powder and moisture ($H_2O$); ionization plates respectively positioned on upper and lower surfaces of the tourmaline intermediate layer interposed there between in the case body; and a conductive plate embedded in the tourmaline intermediate layer.

The device for saving electric power of the present invention may further comprise a morganite powder layer made of morganite powder on upper and lower inner walls of the case body. At this time, each of the ionization plates may be positioned at an interface between the tourmaline intermediate layer and the morganite powder layer.

In one embodiment of the device for saving, electric power of the present invention, the case body may comprise a lower housing and an upper cover, which are detachably coupled to each other. The housing and the cover may be coupled to each other using, solder, welding or adhesive. Alternatively, after a female screw is formed at a portion corresponding to each corner of the cover and the housing, and they may be coupled using screws. However, the present invention is not limited thereto. That is, it will be easily understood by those skilled in the art that the housing and the cover may be coupled to each other by all fastening means for coupling the case body.

In one embodiment of the device for saving electric power of the present invention, an electric wire may be electrically connected to the conductive plate and configured to extend to the outside of the case body. Preferably, an end of the electric wire extending to the outside of the case body may be connected to a power source terminal provided with electric power bus bar to which power is supplied, or a distributing board or circuit breaker.

In one embodiment of the device for saving electric power of the present invention, the ionization plate and/or the conductive plate are preferably formed of copper or aluminum.

The device for saving electric power of the present invention may be configured to be suitable for a single-phase two-wire system, a three-phase three-wire system or a three-phase four-wire system according to the kind of electric power bus bar. For example, when the electric power bus bar is a single-phase two wire system, two devices for saving electric power, each of which is a unit module, may be provided at and electrically connected to two electric power lines, respectively. When the electric power bus bar is a three-phase three-wire system, three devices for saving electric power, each of which is a unit module, may be provided at and electrically connected to three electric power lines, respectively. When the electric power bus bar is a three-phase four-wire system, four devices for saving electric power, each of which is a unit module, may be provided at and electrically connected to four electric power lines, respectively.

However, the present invention is not limited thereto. That is, it will be easily understood by those skilled in the art that a plurality of conductive plates and electric wires are provided corresponding to the number of electric power lines of the electric power bus bar in one device for saving electric power, so that the device can be configured to be suitable for a single-phase two-wire system, a three-phase three-wire system or a three-phase four-wire system.

Meanwhile, the power-saving principle of the device for saving electric power of the present invention will be described below.

The tourmaline intermediate layer contained in the device for saving electric power of the present invention is a mixture layer of tourmaline powder, permanent magnet powder and moisture. If moisture comes into contact with the tourmaline powder, the moisture is instantaneously electrolyzed, and electrons are generated. Further, the morganite powder layer optionally included in the device for saving electric power is a powder layer of a morganite mineral radiating negative ions 10 to 100 times more than a general mineral. The morganite powder layer indirectly improves the movement and flow of electrons through the radiation of negative ions. The ionization plates made of conductive metal are in close contact with the tourmaline intermediate layer and the morganite powder layers to serve as both metal plates of a capacitor. Therefore, the ionization plates induce electrification of positive and negative electric charges, and allow electrons generated by the tourmaline intermediate, layer to be charged and discharged. Since electrons produced by the tourmaline intermediate layer are charged and then discharged due to the capacitor function of the ionization plates, the interior of the device has a conductive property, thereby allowing the parts from the fillers in the device to an external input terminal to be conductive through the conductive plate. Accordingly, the device for saving electric power of the present invention is connected to a power source terminal supplied with power, or a distributing board or circuit breaker, so that current flow is improved, and therefore, the amount of power used can be decreased (see FIG. 7).

Advantageous Effects

A device for saving electric power of the present invention is to remarkably improve the problems of a conventional electric power saving device using far-infrared, and can improve the movement and flow of electrons using a tourmaline mineral having a permanent electric property.

Specifically, in the device for saving electric power of the present invention, the flow of current is remarkably improved through combination of a mixture layer of tourmaline mineral powder and permanent magnet powder and ionization plates for charging and discharging electrons, thereby making it possible to save electric power.

Further, the device for saving electric power of the present invention has an advantage in that the oxidation of a metal component such as a conductive plate accommodated in the device can be minimized, and thus, the lifespan of the device can be extended.

Furthermore, if the electric power saving devices of the present invention, as unit modules, are assembled into a set of electric power saving devices, there is an advantage in that the insulation property, safety and power-saving effect of the device can be maximized.

BRIEF DESCRIPTION OF THE DRAWINGS

The above and other objects and features of the present invention will become apparent to those skilled in the an through the following descriptions of preferred embodiments given in conjunction with the accompanying drawings, in which:

FIG. 1 is an exploded perspective view of an electric power saving device 100 according to an embodiment of the present invention, wherein a portion of a front surface of the device is cut away so that an inside of the device can be seen, and a tourmaline intermediate layer and morganite powder layers, which are inner fillers, are omitted for convenience of illustration so that an inner structure can be easily seen with the naked eye;

FIG. 2 is a longitudinal sectional view of the electric power saving device 100 according to the embodiment of the present invention;

FIG. 3 is a perspective view showing a set 1000 of electric power saving devices of a single-phase two wire system, having two electric power saving devices 100 and 200;

FIG. 4 is a connection wiring diagram showing the set of electric power saving devices of a single-phase two wire system in FIG. 3, wherein the two electric power saving devices are provided at and electrically connected to two power lines provided at a power source terminal, respectively;

FIG. 5 is a perspective view showing a set 1000 of electric power saving devices of a three-phase four-wire system, having four electric power saving devices 100, 200, 300 and 400;

FIG. 6 is a connection wiring diagram showing the set of electric power saving devices of a three-phase four-wire system in FIG. 5, wherein the four electric power saving devices are provided at and electrically connected to four power lines provided at a power source terminal, respectively; and FIG. 7 shows a table and graph related to experimental data in which the amount of electric power used is decreased when the electric power saving device of the present invention is used.

MODE FOR THE INVENTION

Hereinafter, the present invention will be described in detail with reference to the accompanying drawings that are not limitation of the present invention but are only for illustrative purposes.

First of all, the configuration and function of an electric power saving device 100 according to an embodiment of the present invention will be described with reference to FIGS. 1 and 2.

As shown in FIGS. 1 and 2, the electric power saving device 100 according to the embodiment of the present invention comprises a case body 10; a tourmaline intermediate layer 20 accommodated in the case body 10, which is a mixture layer of tourmaline powder, permanent magnet powder and moisture ($H_2O$); ionization plates 30 respectively positioned on upper and lower surfaces of the tourmaline intermediate layer 20 interposed there between in the case body 10; morganite powder layers 50 made of morganite powder positioned on upper and lower inner walls of the case body 10, respectively; and a conductive plate 40 embedded in the tourmaline intermediate layer 20.

The case body 10 comprises an upper cover 12 and a lower housing 14, which are detachably coupled to each other, in the embodiment of the present invention, the cover 12 and the housing 14 may be coupled to each other using solder, welding or adhesive. Although not specifically shown, a female screw is formed at a portion corresponding to each corner of the cover 12 and the housing 14, and then, they may be coupled using screws.

In the case body 10, the cover 12 and the housing 14 are formed of a material capable of protecting against water and dust. For example, the cover 12 and the housing 14 are formed of a material such as iron, aluminum or plastic. However, for their insulation property and stability, a nonconductor is preferably used, and a plastic material is more preferably used. For example, the cover 12 and the housing 14 are most preferably formed of a PC/ABS plastic material. Since the PC/ABS plastic material has strength similar to that of iron and is a flame retardant material, the PC/ABS plastic material has the optimum conditions as a material of the case body 10 of the electric power saving device 100 of the present invention.

Meanwhile, although not specifically shown in FIGS. 1 and 2, when a plastic material is used, the inner walls of the case body 10 may be plated with zinc. When it is difficult to perform the zinc-plating, it is possible to coat the inner walls of the case body 10 with a paint containing a zinc component (50% or more). When the zinc paint is applied, the thickness of the zinc paint is preferably 1 mm or less (not shown). Preferably, the case body 10 is securely waterproofed by sealing a joint 16 of an edge portion of the cover 12 and the housing 14 with silicone when the cover and the housing are coupled to each other. Particularly, when the cover 12 and the housing 14 are fastened together using screws, their edge portion may not be precisely in close contact with each other, silicone waterproof treatment is essential.

The tourmaline intermediate layer 20 laminated to a predetermined thickness and accommodated in the cast body 10 is a mixture layer of tourmaline powder, permanent magnet powder and moisture (H2O). In the present invention, tourmaline may be the most important component.

Tourmaline is a mineral pertaining to a hexagonal system and generates electricity by friction. After Pierre found in 1880 that an electric charge (electricity) is produced on a crystal surface of tourmaline, the tourmaline has been referred to as an electric stone. It has been found that although the tourmaline is ground as small as possible, positive and negative polarities exist at both ends of each tourmaline crystal, and the tourmaline has an electrode that is not at permanently as long as the tourmaline is not heated up to about 1000° C. It has been known that if the positive and negative polarities of the tourmaline crystal are connected, a weak current of 0.06 mA flows.

Even when the tourmaline is ground to have a particle site of 0.3 μm, positive and negative polarities exist at both ends of each tourmaline crystal. Therefore, the tourmaline powder contained in the tourmaline intermediate, layer 20 of the electric power saving device 100 of the present invention maintains electrical properties as it is. In the electric power saving device 100 of the present invention, the tourmaline powder is a polar crystal having electric polarization from beginning although an electric field is not applied to the tourmaline powder from the outside, and electrodes are formed at both the ends of each crystal of the tourmaline powder. However, positive and negative electrodes of the crystal of the tourmaline powder are not necessarily in equilibrium but are always in an unstable state, so that electrons continuously flow toward the positive electrode from the negative electrode. Therefore, in the electric power saving device 100 of the present invention, the tourmaline powder continuously generates a weak current. If the moisture contained in the tourmaline intermediate layer 20 comes into contact with the tourmaline powder, the moisture is instantaneously electrolyzed to generate electrons.

A permanent magnet is a magnet that generates and maintains a stable magnetic field without supply of electric energy from the outside. In the electric power saving device 100 of the present invention, any powder of a permanent magnet commercially available may be used as permanent magnet powder, and magnetite powder is preferably used as the permanent magnet powder. In the electric power saving device 100 of the present invention, it is considered that the permanent magnet powder contained in the tourmaline intermediate layer 20 helps the tourmaline powder to electrolyze the moisture and generate electrons.

Meanwhile, the tourmaline powder of 325 meshes or more is preferably used in the tourmaline intermediate layer 20 of the electric power saving device 100 of the present invention, and the permanent magnet powder of 325 meshes or more is also used therein.

The morganite powder layer 50 is a powder layer of a morganite mineral radiating negative ions 10 to 100 times more than a typical mineral. An upper morganite powder layer 50a is positioned to be laminated to a predetermined thickness toward the upper inner wall of the cover 12, and a lower morganite powder layer 50b is positioned to be laminated to a predetermined thickness toward to the lower inner wall of the housing 14. Morganite is a mineral (BeAlSiO) contained in sand of river and smoky quartz 3 2 6 18 in a large amount. Since the morganite has a property of radiating a large amount of negative ions, it is applied to various types of daily necessaries and the like. Since rough morganite also emits radiation, it is used in the form of powder through sintering and in a state of powder of 325 or 80 meshes. The morganite powder layer 50 indirectly contribute to improving the movement and flow of electrons through radiation of negative ions.

The ionization plates 30 are positioned on the upper and lower surfaces of the tourmaline intermediate layer 20 interposed there between in the case body 10, respectively. An upper ionization plate 30a is positioned between the tourmaline intermediate layer 20 and the upper morganite powder layer 50a. When the cover 12 is separated from the housing 14 of the case body 10, the upper ionization plate 30a together with the cover 12 escapes from the housing 14. On the other hand, a lower ionization plate 30b is positioned between the tourmaline intermediate layer 20 and the lower morganite power layer 50b. When the cover 12 is separated from the housing 14 of the case body 10, the lower ionization plate 30b is positioned in the housing 14.

All the upper and lower ionization plates 30a and 30b are made of a conductive metal such as copper or aluminum. The ionization plates 30a and 30b made of the conductive metal are in close contact with the tourmaline intermediate layer 20 and the morganite powder layers 50a and 50b to function as both metal plates of a capacitor. Thus, electrons produced by the tourmaline intermediate layer 20 are charged and then discharged due to the capacitor function of the ionization plates 30 and allows the parts from the fillers in the device to an external input terminal to be conductive through the conductive plate 40 which will be described later.

The conductive plate 40 is embedded in the tourmaline intermediate layer 20. Preferably, the material of the conductive plate 40 is copper (a purity of 99.9%). Since the conductive plate 40 is embedded in the tourmaline intermediate layer 20 containing moisture, it may be oxidized due to the moisture. However, the oxidization by the moisture is minimized by a reducing process of electrons transmitted by the electric discharge of the ionization plates 30 as described above. Accordingly, the electric power saving device 100 of the present invention has an advantage in that oxidization of a metal component such as the conductive plate contained in the device is minimized to thereby extend the lifespan of the device.

Although any commercial electric wire may be used as an electric wire 60 for connecting the conductive plate 40 to an electric power bus bar of a power source terminal 80 (see FIGS. 4 and 6), an electric wire with a sufficient thickness, suitable for safety standards, is used as the electric wire 60. A terminal 70 connecting one end 60a of the electric wire 60 to the conductive plate 40 should be tightened so that a gap there between is not produced.

An electric wire holder 62 uses standards suitable for the electric wire 60 and causes the electric wire to securely and hermetically adhere to the housing using silicone or adhesive so that moisture in the device does not leak out when the housing 14 of the case body 10 is connected to the electric wire 60.

As shown in FIGS. 3 and 4, the electric wire 60 extends to the outside of each electric power saving device 100 or 200, and the other end 60b of the electric wire 60 extending to the outside is connected to the power source terminal 8) having an electric power bus bar through which electric power is supplied, or a distributing board or circuit breaker. If a set 1000 of electric power saving devices of the present invention is electrically connected to the power source terminal 80 or a distributing board or circuit breaker (not shown), current flow is improved, and therefore, the amount of electric power used is decreased.

FIG. 7 shows experimental data in which the amount of electric power used is decreased when the electric power saving device of the present invention is used. As confirmed in the table and graph of FIG. 7, it can be seen that the electric power saving device of the present invention reduces electric power through a decrease in current by improving only the flow of current without an artificial voltage drop.

Generally, while electricity supplied from a power station is transmitted to a user along an electric power bus bar, the waveform of a sine wave is distorted due to impedance of an electric power cable and other various factors, and therefore, loss of electric energy occurs. As described above, the electric power saving device improves flow of current and corrects the waveform of the distorted sine wave, whereby power consumption used in an electric user (home, factory, office, shop and the like) can be saved.

Meanwhile, the electric power saving device should be configured to be suitable for a single-phase two-wire system, a three-phase three-wire system or a three-phase four-wire system according to the kind of electric power bus bar supplied to an actual electric user. Thus, the electric power saving device 100 of FIGS. 1 and 2 is one unit module, and such unit modules 100, 200, 300 and 400 are assembled into a set 1000 of electric power saving devices to be connected to an electric power bus bar.

As shown in FIGS. 3, 4, 5 and 6, if the electric power bus bar is a single-phase two wire system, two electric power saving devices 100 and 200 are electrically connected to two electric power lines (L and N of FIG. 4) provided in the power source terminal 80, respectively (see FIGS. 3 and 4). If the electric power bus bar is a three-phase four-wire system, four electric power saving devices 100, 200, 300 and 400 are electrically connected to four electric power lines (R, S, T and N of FIG. 5) provided in the power source terminal 80, respectively (see FIGS. 5 and 6). With such a configuration, there is an advantage in that the insulation property, safety and power-saving effect of the set 1000 of electric power saving devices of the present invention can be maximized.

Meanwhile, although not specifically shown, a plurality of conductive plates 40 and electric wires 60 in the single electric power saving device 100 shown in FIG. 1 may be provided corresponding to the number of electric power lines in an electric power bus bar, so that the electric power saving device can be connected to the power source terminal 80 or the distributing board and circuit breaker.

For example, when the power source terminal 80 is a single-phase two-wire system, two conductive plates 40 and two electric wires 60 respectively connected to the two conductive plates 40 are provided in the electric power saving device 100 of FIG. 1. That is, one ends of the two electric wires 60 are connected to the two conductive plates 40 using two terminals 70, respectively, and the other ends of the two electric wires 60 extend to the outside of the case body 10 and are connected to the power source terminal 80 of a single-phase two-wire system. When the power source terminal 80 is a three-phase three-wire system or a three-phase four-wire system, the electric power saving device 100 may also be configured in the same manner as a case of a single-phase two-wire system.

Although the present invention has been described in connection with the accompanying drawings and the aforementioned embodiments, the present invention is not limited to the accompanying drawings and the disclosed embodiments. It will be readily understood by those skilled in the art that various modifications and changes can be made thereto according to the purport of the present invention and the modifications and changes are included in the scope of the present invention.

The invention claimed is:

1. A device for saving electric power, comprising:
   a case body;
   a tourmaline intermediate layer accommodated in the case body, the tourmaline intermediate layer being a mixture layer of tourmaline powder, permanent magnet powder and moisture ($H_2O$);
   ionization plates respectively positioned on upper and lower surfaces of the tourmaline intermediate layer interposed there between in the case body; and
   a conductive plate embedded in the tourmaline intermediate layer.

2. The device as claimed in claim 1, further comprising a morganite powder layer made of morganite powder on upper and lower inner walls of the case body, wherein each of the ionization plates is positioned at an interface between the tourmaline intermediate layer and the morganite powder layer.

3. The device as claimed in claim 1, wherein unit modules of the devices for saving electric power are assembled into a set of devices for saving electric power according to the type of electric power bus bar, and are connected to the electric power bus bar.

4. The device as claimed in claim 3, wherein when the electric power bus bar is a single-phase two-wire system, the two unit modules of the devices for saving electric power are provided at and electrically connected to two electric power lines, respectively.

5. The device as claimed in claim 3, wherein, when the electric power bus bar is a three-phase four-wire system, the four unit modules of the devices for saving electric power are provided at and electrically connected to four electric power lines, respectively.

6. The device as claimed in claim 3, wherein, when the electric power bus bar is a three-phase three-wire system, the three unit modules of the devices for saving electric power are provided at and electrically connected to three electric power lines, respectively.

7. The device as claimed in claim 1, wherein the case body comprises a lower housing and an upper cover, which are separated from each other or joined together.

* * * * *